(No Model.) 5 Sheets—Sheet 4.
R. I. BROWN.
BELTING FOR TRANSMISSION OF POWER.
No. 549,953. Patented Nov. 19, 1895.
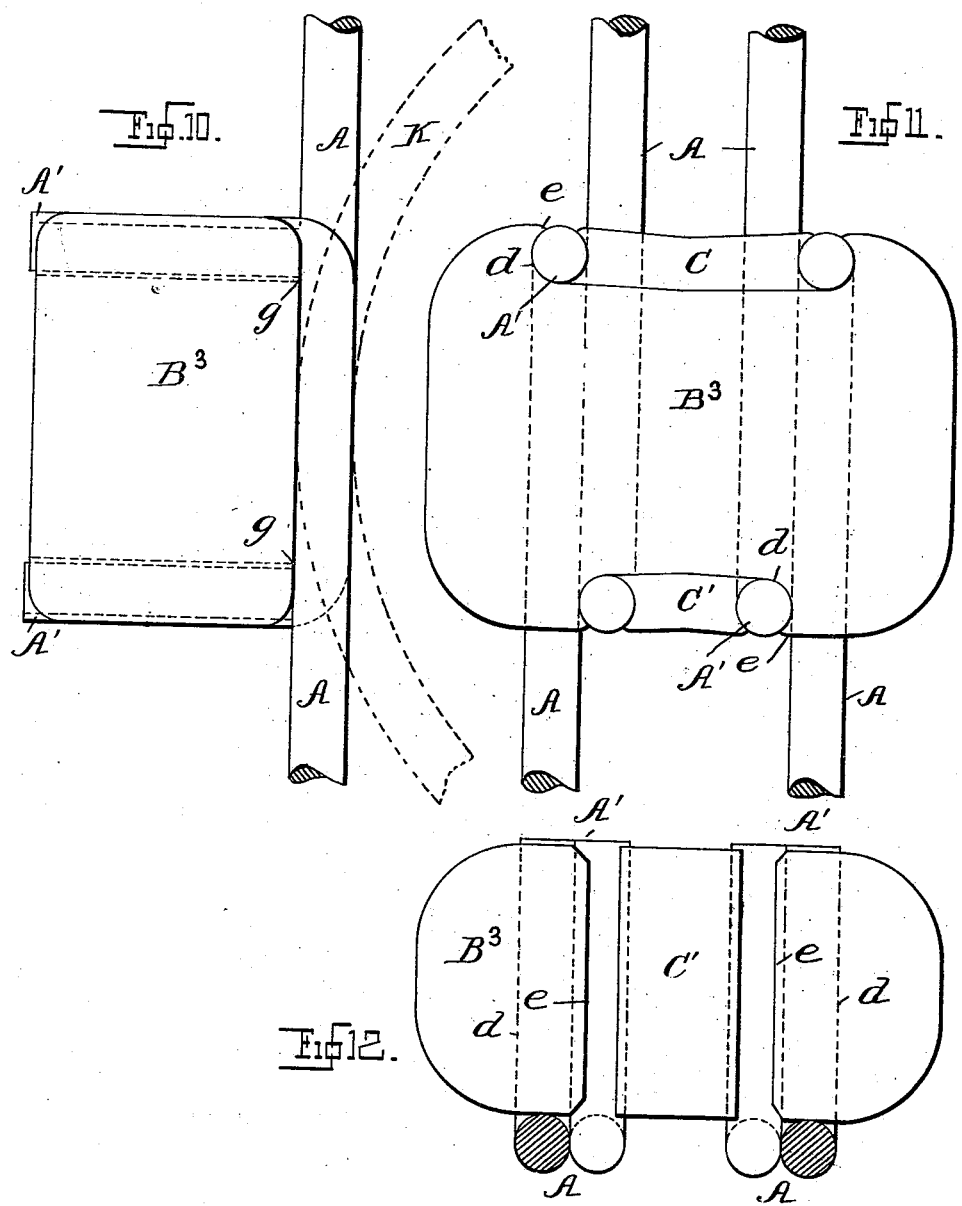

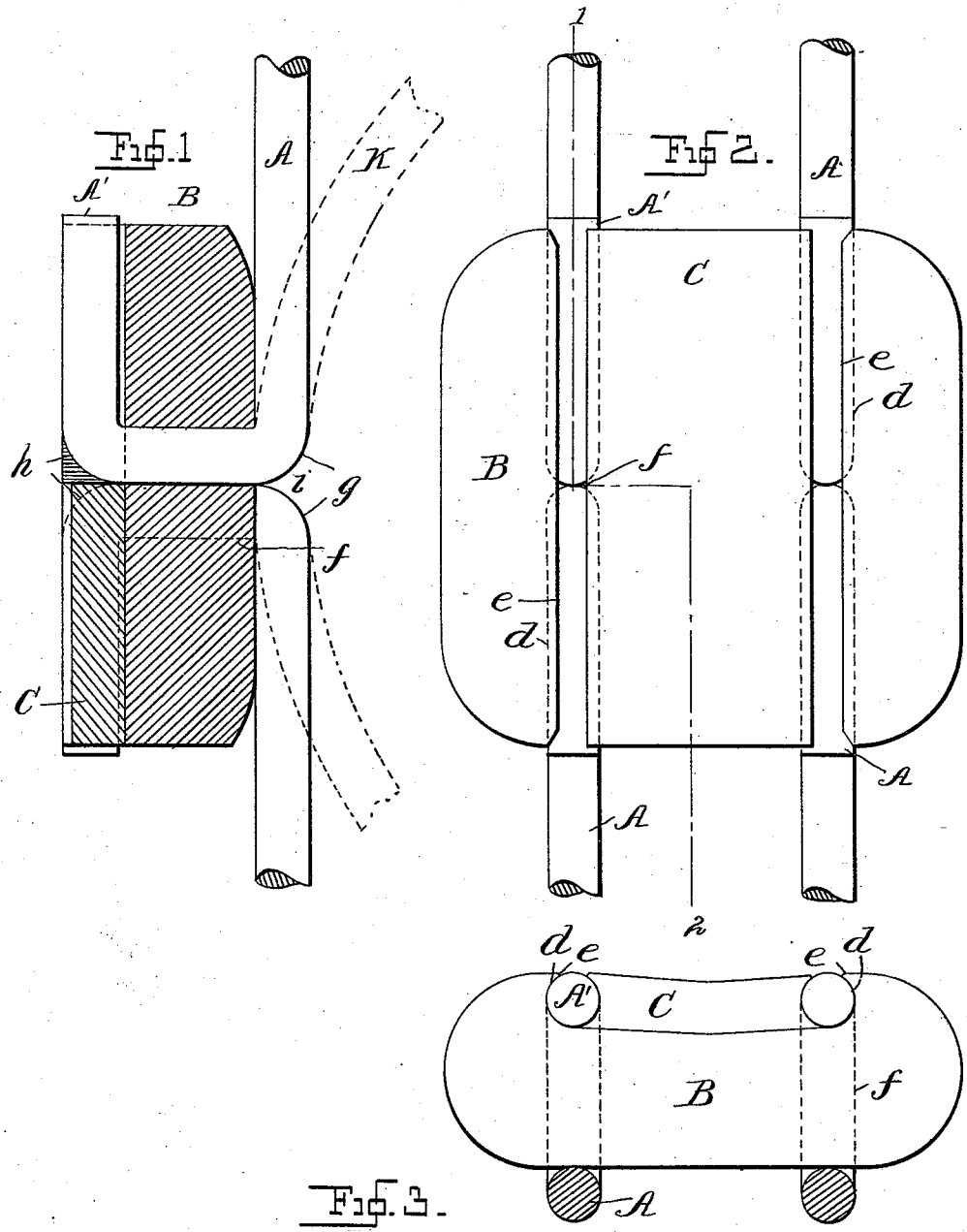

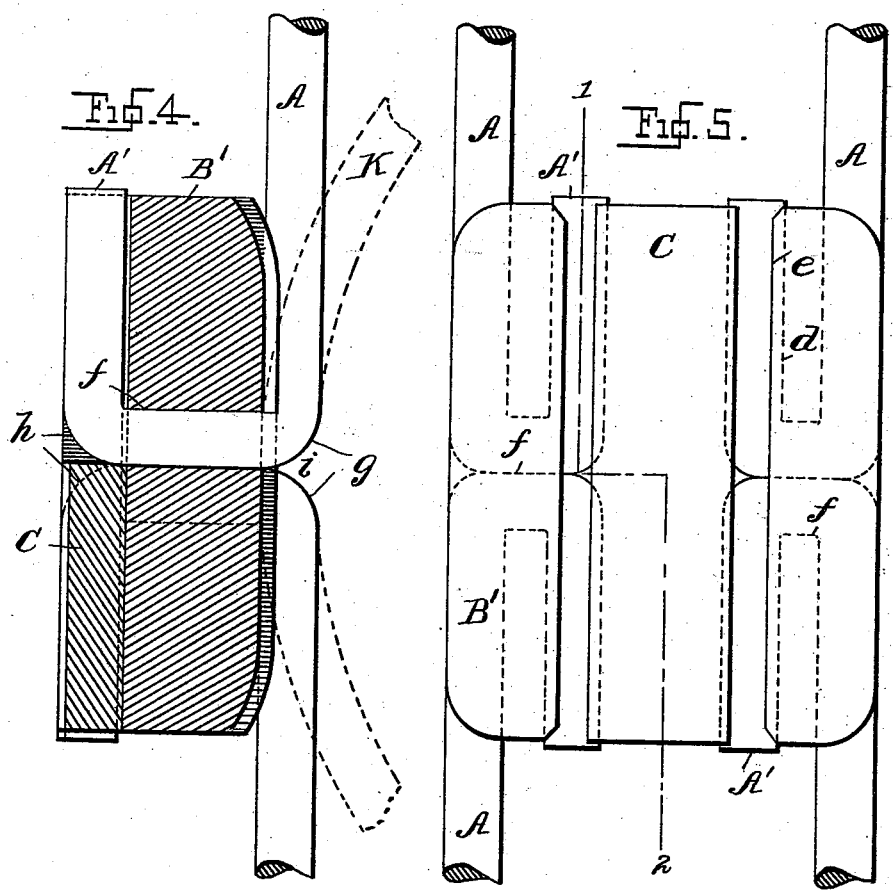
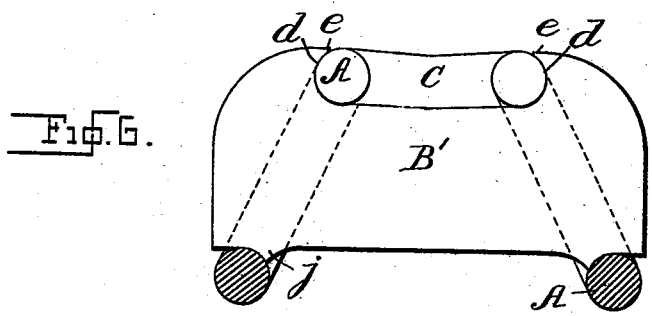

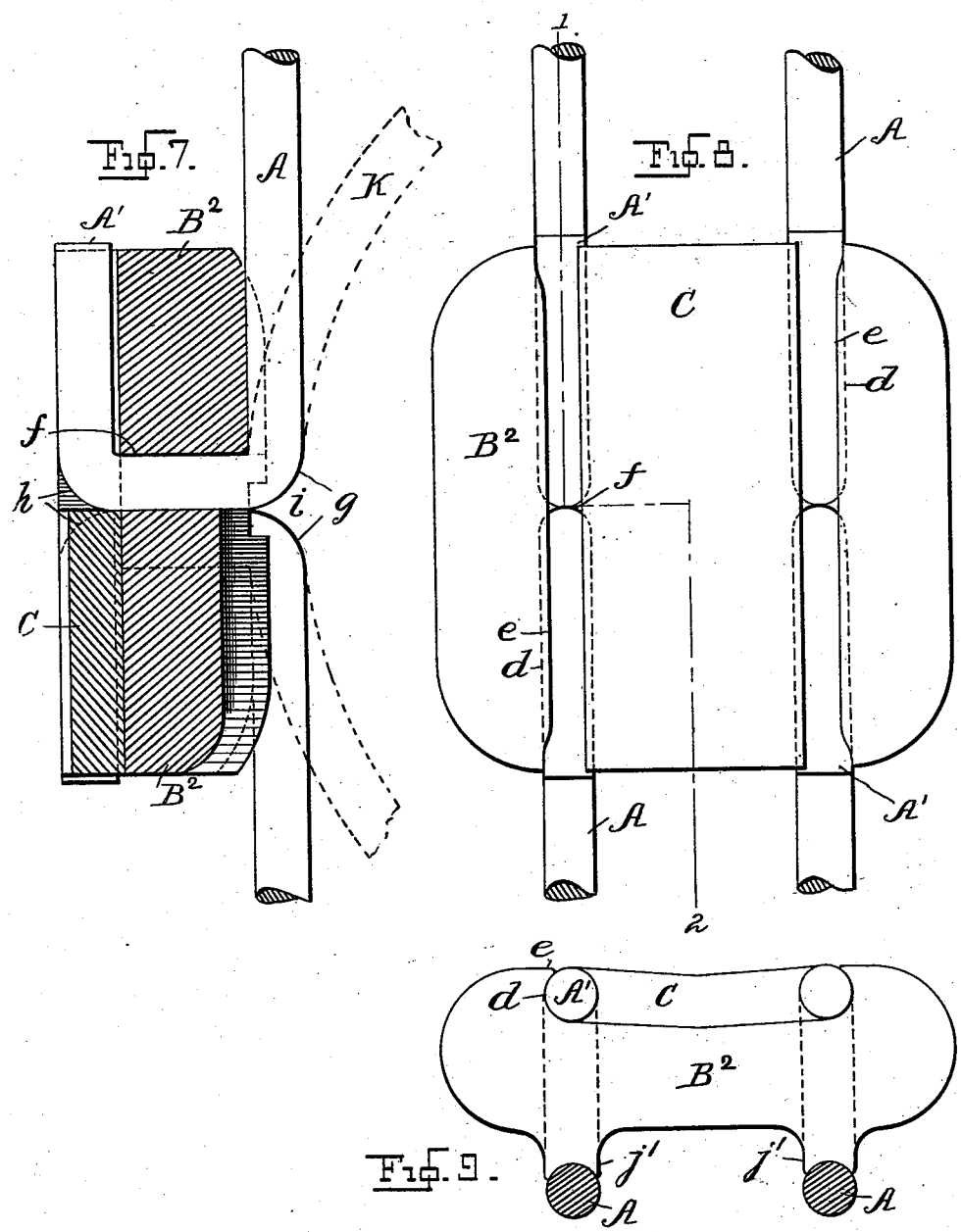

(No Model.)  R. I. BROWN.  5 Sheets—Sheet 5.
BELTING FOR TRANSMISSION OF POWER.
No. 549,953. Patented Nov. 19, 1895.
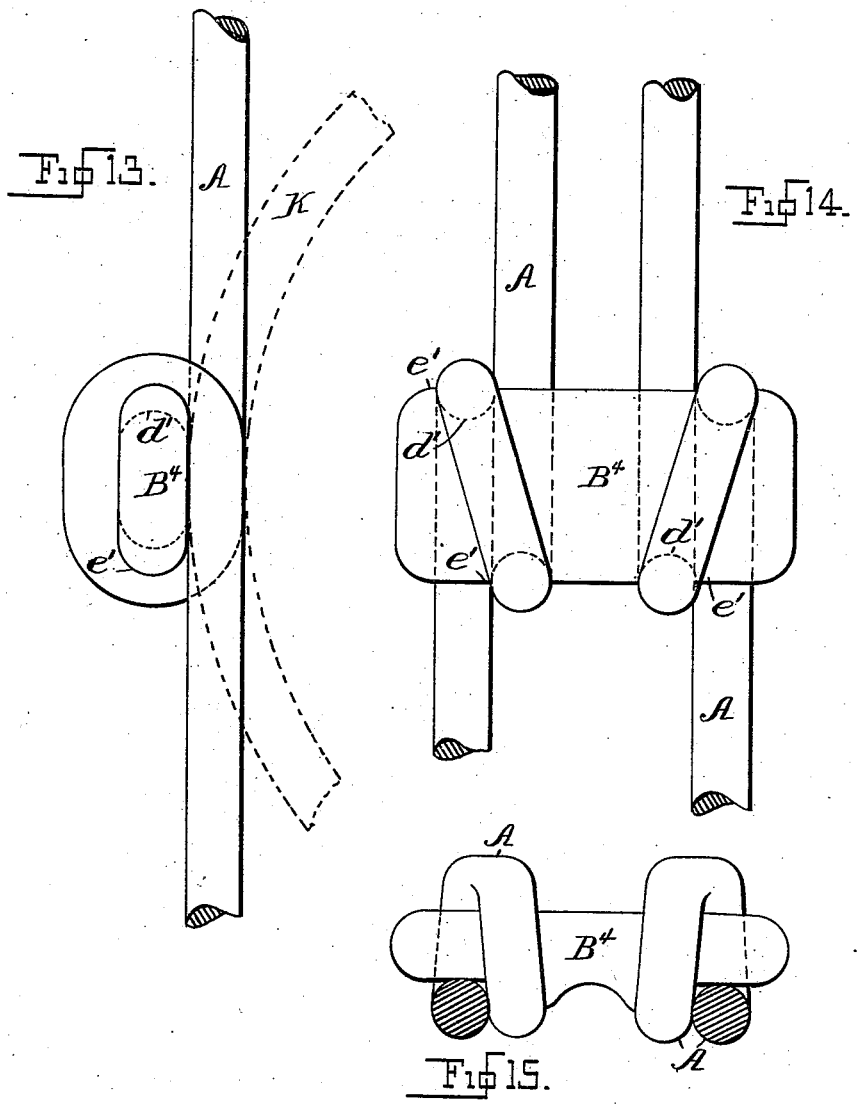

UNITED STATES PATENT OFFICE.

ROBERT INGM. BROWN, OF NEW YORK, N. Y.

BELTING FOR TRANSMISSION OF POWER.

SPECIFICATION forming part of Letters Patent No. 549,953, dated November 19, 1895.

Application filed January 30, 1894. Serial No. 498,464. (No model.)

*To all whom it may concern:*

Be it known that I, ROBERT INGRAM BROWN, a citizen of the United States, residing at New York, in the county and State of New York, have invented new and useful Improvements in Belting for Transmission of Power, of which the following is a specification.

My invention relates to improvements in machine-belting made entirely of metal, and more especially to that class of metallic belts in which the bending of the belt around wheels springs the material of the belt; and the objects of my invention are, first, to increase the smooth and quiet running of this style of belting; second, to increase their general durability; third, to produce belting of this style which can be run satisfactorily over very small wheels, and, fourth, to make a belt of this style in which the cross-bars uniting tension members of the belt shall have the least possible chance of contact with the wheels or other parts of machinery. I attain these objects by placing the cross-bars of the belt as shown in the accompanying drawings, in which—

Figure 1 is a section on the line 1 2, Fig. 2. Fig. 2 is a plan view; Fig. 3, an end view; Fig. 4, a section on the line 1 2, Fig. 5. Fig. 5 is a plan view; Fig. 6, an end view of the same. Figs. 7, 8, 9, 10, 11, 12, 13, 14, and 15 are modified forms of my present invention.

Similar reference-marks refer to similar parts in the several views and styles.

A is the wire which is the tension member, and bends when the belt is bent around wheels.

B is the body or tie of the cross-bar which unites and spaces the parallel wires of the belt, and in this case unites the ends of short wires to make the belt.

C is the strut of the cross-bar, and serves to force and rigidly hold the ends A' of the wire A to the grooves $d$, formed under the hooked projections $e$ of the tie B. The slots $ff$ have been cut through the tie B to allow the ends A' of the wires to be passed through.

The wires A are bent at an angle, as shown at $g\,g$, (see Fig. 1,) and pass upwardly through the slots $ff$ in the tie B, and are then again bent, as shown at $h\,h$—that is, so that the ends A' are about parallel with the main portion A. The strut C is then forced into place, so that it binds the ends A' against the sides of the tie B and thereby firmly securing the parts. It will be seen that by this arrangement the wires A have an uninterrupted riding-edge on the under side, except at the very small interval $i$, and that they are free to sink into shallow grooves on the wheels or into the rubber-faced wheels without the body B of the cross-bar coming in contact therewith. This makes a belt which may be run at five thousand feet per minute with considerably less noise than leather belting at an equal speed. The double bends at $g$ and $h$ on the wires may be made very sharp when using the highest grades of music-wire and greatly reduce the power required in the strut C to hold the ends A'.

The curved dotted lines K show the position and springing of the wires as they go around wheels. The wires are free to spring throughout their length until they pass into the slots $ff$. Thus it is only at $i$ that there is the slightest cause for uneven riding on the wheels. This is very slight and only noticeable when used on wheels of very small diameter.

The arrangement shown in Figs. 4, 5, and 6 is but slightly different from that just described, and consists, essentially, in having the slots $f\,f$ converge as they pass upward from the under side of the tie B' to the upper side where the strut C secures the ends A' of the wires. This allows sufficient metal at $e$ to resist the force of the struts C, and yet the tie B' is not so wide as to project beyond the wire at the edge of the belt. The projection $j$ may be made on the under side of the tie B' to give a better seat for the wires A. A belt made in this way has one side and both edges practically smooth, and guides may be placed at either edge, as is necessary for a shifting-belt.

In Fig. 7, 8, and 9 the holes $f$ are shown straight through the tie $B^2$, as in Figs. 1, 2, and 3, but they may be made to converge, as in Figs. 4, 5, and 6. The essential feature shown in Figs. 7, 8, and 9 is the size of the projection or seats $j'\,j'$ on the under side of the tie $B^2$. They may be made quite long, so as to raise the tie $B^2$ entirely above the sides of any grooves made in the wheels to receive the wires A A. It may be made straight, as shown, or inclined, if desired, as when the slots $f\,f$ are made converging.

In Figs. 10, 11, and 12 I show a modified form for use on wheels of very small diameter. Here the tie $B^3$ is prepared to receive two struts C and C' of different lengths, and the wires A are bent up at $g\,g$, but there is no second bend, as at $h\,h$, in the previously-described figures, and the gripping-pressure of the struts C and C' comes on the upward parts of the wires. This entirely removes the unevenness shown at $i$ in the figures previously described, and it also relieves the angles at $g\,g$ in the wire A from all springing when going around the wheel. This removes absolutely every inequality of strain produced on the wires while bending around the wheels. It will thus be seen that no matter how small the wheels over which the belt is run, the cross-bars or ties have no baneful effect on the durability of the wires as they produce no different strain in the springing parts of the wires than if they were not there.

In Figs. 13, 14, and 15 I have shown a form that can be very cheaply constructed, and is used in making long lengths of belting from continuous wires. Music-wire is very well adapted to this construction, as it is very tough. After being bent around the tie or cross-bar $B^4$ it may be subjected to severe tension, so as to set it tightly in the grooves $d'$. This style cannot be used to join the ends of such belting.

A A is the wire.

$B^4$ is the cross-tie, which has no strut C, though there are the grooves $d'$ into which the wires set, so that the corners $e'$ prevent their slipping off the tie $B^4$.

No claim is here made to the use of the strut C in securing the wires; and this method of securing is not an essential feature in the present invention.

In speaking of the ties or cross-bars I mean not only the main or body part, but all parts which co-operate to secure the wires. These parts combined make the tie.

It is not necessary to follow the exact proportions or designs shown in these drawings to carry out my invention; and the features illustrated in several of the drawings may be combined in one tie or cross-bar, or different cross-bars embodying any of the seatures may be spaced, as desired, on one belt.

It is not the intention to confine this invention to belts wherein only two wires or strands are used, but any number may be placed side by side and united by cross-bars made long enough.

Having thus described my invention, what I claim as new, and desire to secure by Letters Patent, is—

1. A belt for the transmission of power composed of parallel wires or strands bent at intervals away from one side of the belt and rigidly united together by cross-bars or clips, said wires being, between the clips, parallel to the riding surface of the belt and adapted to bend to and ride directly upon wheels.

2. A transmission belt composed of wires, ropes or bands which bend or spring in the bending of the belt and are rigidly united together at intervals along the belt by cross-bars, the belt having throughout the part of its length occupied by the cross-bar a section of wires, ropes or bands free to bend independently of said cross-bar and ride directly on wheels, substantially as shown at K.

3. A belt for the transmission of power composed of flexible, parallel wires or strands rigidly united at intervals by cross-bars or ties raised above the riding side of the belt, substantially as shown and described.

4. A belt for the transmission of power composed of flexible, parallel wires or strands rigidly united together at intervals by cross-bars or ties entirely raised from the longitudinal line of the wires or strands in the belt, substantially as shown and described.

ROBT. INGM. BROWN.

Witnesses:
WM. A. COURTLAND,
J. GREEN.